United States Patent [19]

Kobayashi

[11] Patent Number: 5,140,241
[45] Date of Patent: Aug. 18, 1992

[54] WIPER SYSTEM FOR AUTOMOTIVE VEHICLE

[75] Inventor: Toshio Kobayashi, Kanagawa, Japan

[73] Assignee: Nissan Motor Company, Limited, Japan

[21] Appl. No.: 543,959

[22] Filed: Jun. 27, 1990

[30] Foreign Application Priority Data

Jun. 28, 1989 [JP] Japan ................... 1-165689

[51] Int. Cl.⁵ ................................ B60S 1/08
[52] U.S. Cl. .................... 318/626; 318/DIG. 2; 15/250.17; 296/192
[58] Field of Search ......... 318/443, 444, 558, DIG. 2, 318/567, 626, 671; 15/250.31, 250.19, 250.17, 250.16; 296/84.1, 96.15, 96.16, 96.21, 187, 192, 96.17

[56] References Cited

U.S. PATENT DOCUMENTS 3,843,194 10/1974 Yamada .................. 296/96.17 X
4,852,205 8/1989 Tanaka et al. ........... 318/DIG. 2 X Primary Examiner—Bentsu Ro
Attorney, Agent, or Firm—Lowe, Price, LeBlanc & Becker

[57] ABSTRACT

A wiper system for automotive vehicles has a wiper receiving cavity between a windshield and an engine hood. The wiper receiving cavity has an opening through which a wiper goes in and out and which is open and closed by means of a lid member. The usual operation of the wiper system is performed in response to turning ON of a manually operable wiper switch. The wiper system has also another manual switch, operable independently of operation of the wiper switch, for allowing the lid member to be open in response to turning ON thereof. In addition, the wiper system includes means for changing a lower angular position thereof to a higher position.

6 Claims, 3 Drawing Sheets

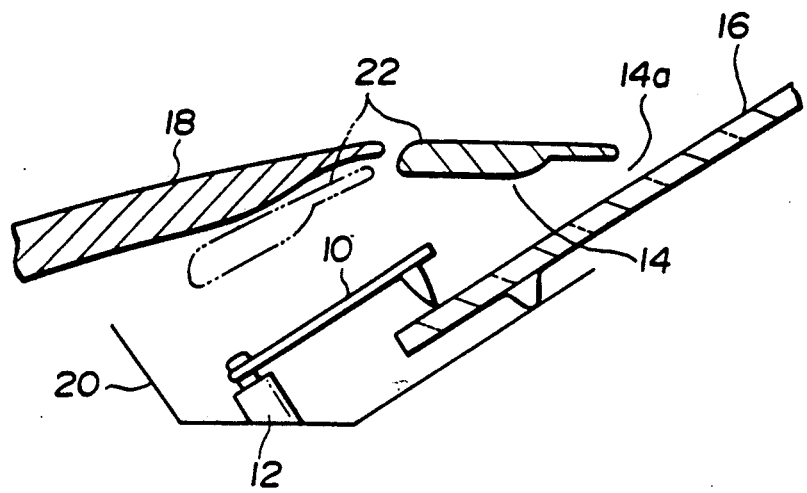
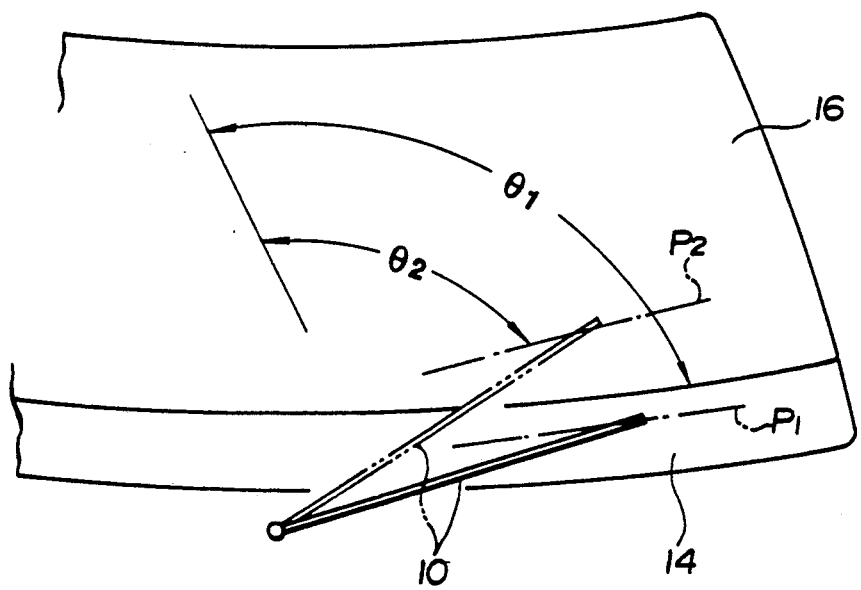

WIPER SYSTEM FOR AUTOMOTIVE VEHICLE

BACKGROUND OF THE INVENTION

1. Field of the Invention

The present invention relates generally to a wiper system for automotive vehicles. More specifically, the invention relates to an enclosed type of wiper system in which a wiper is received in a cavity defined by a windshield and an engine hood.

2. Description of the Background Art

In recent years, various types of wiper systems have been proposed. Some of wiper systems have a wiper receiving cavity between a windshield and an engine hood. Such a wiper system will be hereinafter referred to as an "enclosed type wiper system". Such wiper systems have been disclosed in Japanese patent First (unexamined) Publication (Tokkai Sho.) No. 59-53255 and Japanese Utility Model First (unexamined) Publication (Jikkai Sho.) No. 60-178263. In the disclosed wiper systems, the wiper receiving cavity has an opening through which the wiper goes in and out, and which is open and closed by means of a lid member. When a wiper switch is turned on in order to drive the wiper, the lid member is open by means of a lid driving means, and then, the wiper is drawn out of the wiper receiving cavity by means of a wiper driving means, to oscillate within a predetermined working-angle for sweeping raindrops off the windshield. On the other hand, when the wiper switch is turned off, the wiper is stopped within the wiper receiving cavity, and then the lid member is closed.

In the aforementioned wiper systems, the lid member of the wiper receiving cavity is respectively open and closed in response to turning ON and OFF of the wiper switch, and is usually closed while the wiper is not used. Therefore, when the vehicle is exposed in a very cold atmosphere, such as in winter, for a long time, it is possible that the peripheral edge of the lid member may become frozen to the opening edge of the wiper receiving cavity so that the lid member cannot open. When the wiper switch is turned on while the lid member is frozen, damage to, or failure of, the lid member opening and closing unit may occur.

In addition, in the aforementioned conventional enclosed type wiper systems, the working-angle of the wiper cannot be changed. Therefore, when it is or has been snowing, it is apprehended that the wiper causes snow on the windshield to be introduced into the wiper receiving cavity to become packed therein, since the lower angular position of the wiper is within the wiper receiving cavity.

SUMMARY OF THE INVENTION

It is therefore a principal object of the present invention to eliminate the aforementioned disadvantages and to provide a wiper system which can cause a lid member of a wiper receiving cavity to be opened and closed, independently of a wiper switch by which usual operation of the wiper system is initiated.

In order to accomplish the aforementioned and other objects, a wiper system for automotive vehicles includes first and second manual switches which are operable independently of each other. In response to turning ON of the first switch, usual operation of the wiper system may be performed with respect to the pivotal movement of a wiper and the movement of a lid member which covers a wiper receiving cavity. In response to turning ON of the second switch, the lid member may be caused to be open, independently of the operation of the first switch.

According to one aspect of the present invention, a wiper system for an automotive vehicle comprises:

a wiper pivotably supported on a vehicular body;

receiving means for receiving the wiper therein, the receiving means having an opening through which the free end of the wiper goes in and out;

lid member, associated with the opening of the receiving means, movable between a closed position in which the lid member closes the opening and an open position in which the lid member opens the opening;

first actuator means for causing the wiper to pivot between a preset upper angular position and a first preset lower angular position arranged within the receiving means;

second actuator means for causing the lid member to move between the open and closed positions;

a first manual switch for allowing the pivotal movement of the wiper and the movement of the lid member;

a second manual switch, operable independently of operation of the first manual switch, for allowing the lid member to move to the open position in response to turning ON thereof; and control means for outputting a first control signal to the first and second actuator means in response to turning ON of the first manual switch so that the first actuator means causes the pivotal movement of the wiper after the second actuator means causes the lid member to move to the open position, and for outputting a second control signal to the first and second actuator means in response to turning OFF of the first manual switch so that the second actuator means causes the lid member to move to the closed position after the first actuator means causes the wiper to be stopped the control means further outputting a third control signal to the second actuator means in response to turning ON of the second manual switch so that the second actuator means causes the lid member to move to the open position.

The wiper system may includes switching means for changing the first preset lower angular position into a second preset lower angular position arranged at a location higher than the first preset lower angular position. The wiper system may includes detecting means for monitoring at least one of the open and closed positions of the lid member to produce at least one open or closed position representative signal to be input to the control means. The switching means may change the first preset lower angular position to the second preset lower angular position, in response to turning ON of the second manual switch after the open position is detected by means of the detecting means while the first manual switch is ON. The control means may also output a fourth control signal to the second actuator means when no open position is detected by means of the detecting means while at least one of the first and second manual switches is turned on, so that the second actuator means causes the lid member to be open. The control means may further output a fifth control signal to prevent the second actuator means from causing the lid member to move when no open position is detected by means of the detecting means after the control means outputs the fourth control signal to the second actuator means. The wiper system may further comprise warning means for informing the user when the control means outputs the fifth control signal. In addition, the control means may output a sixth control signal to the first and second actuator means when the open position is detected by means of the detecting means while both of the first and second manual switches are turned off, so that the second actuator means causes the lid member to move to the closed position after the first actuator means causes the wiper to move from the first preset lower angular position to the second preset lower angular position. The control means may output a seventh control signal to prevent the second actuator means from causing to the lid member to move when the open position is detected by means of the detecting means after the control means outputs the sixth control signal to the second actuator means. Furthermore, the wiper system may further comprise warning means for informing the user when the control means outputs the seventh control signal.

BRIEF DESCRIPTION OF THE DRAWINGS

The present invention will be understood more fully from the detailed description given herebelow and from the accompanying drawings of the preferred embodiment of the invention. However, the drawings are not intended to imply limitation of the invention but are for explanation and understanding only.

In the drawings:

FIG. 1 is a schematic view of a wiper system, according to the present invention;

FIG. 3 is a schematic view showing the changing of a sweep angle of a wiper in the wiper system of FIG. 1.

DESCRIPTION OF THE PREFERRED EMBODIMENT

Figure 2:
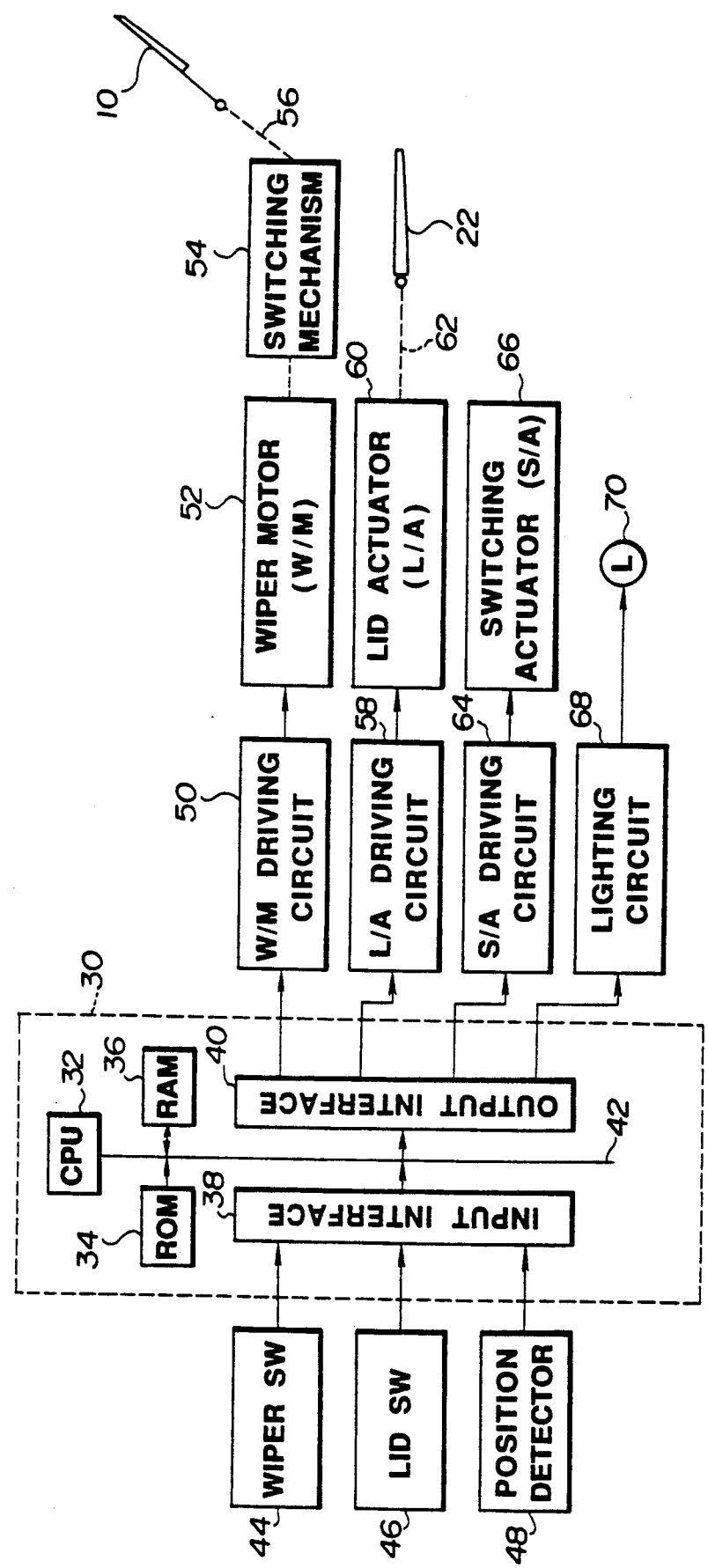
FIG. 2 is a block diagram of a control system for the wiper system of FIG. 1.

Referring now to the drawings, particularly to FIG. 1, a wiper 10 is oscillatably supported on a pivotal shaft 12 mounted on the vehicular body, so that the wiper 10 can pivot along a windshield 16. At a base portion of the windshield 16, the end portion of an engine hood 18 is so arranged as to be separated from the windshield by a predetermined distance. A panel 20 is arranged below the engine hood 18, so that a cavity 14 is defined by the windshield 16, the engine hood 18 and the panel 20. When the free end of the wiper 10 is positioned at its lowest position, the entire portion of the wiper 10 is received within the cavity 14, which will therefore be referred to as a wiper receiving cavity. The wiper receiving cavity 14 has an opening 14a through which the free end of the wiper 10 goes in and out when the wiper 10 oscillates. The opening 14a of the wiper receiving cavity 14 is open and closed by means of a lid member 22.

The pivotal movement of the wiper 10, and the opening and closing of the lid member 22 are controlled by means of a control unit 30 as shown in FIG. 2. The control unit 30 comprises a microcomputer which includes a CPU 32, a ROM 34, a writable and readable RAM 36, an input interface 38, an output interface 40 and a bus 42.

As is well known, the CPU 32 has a calculation function. The ROM 34 has a processing program for the wiper operation, and the opening and closing of the lid member 22. The RAM 36 serves to store the data from the CPU 32 and other data. The input interface 38 serves to input external signals to the CPU 32. The output interface 40 serves to output the result processed by the CPU 32 to an external circuit. The CPU 32, the ROM 34, the RAM 36, and the input and output interfaces 38 and 40 are connected to each other by means of the bus 42.

The input interface 38 is connected to a manually operable wiper switch 44 for causing the wiper 10 to move in response to turning ON thereof. In the usual operation, the opening and closing of the lid member 22 are performed depending upon the turning ON and OFF of the wiper switch 44. The input interface 38 is also connected to a manually operable lid member switch 46 for causing the lid member 22 to be opened and closed independently of operation of the wiper switch 44. When the user causes the lid member switch 46 to be turned. The lid member 22 is kept to be open independently of operation of the wiper switch 44. As will be described hereinafter, the user may previously cause the lid member switch 45 to be turned on, in a case where it is apprehended that the peripheral edge of the lid member 22 is frozen to the end surface of the opening 14a of the wiper receiving cavity 14 when it is too cold, for example, in winter. In addition, the input interface 38 is connected to a position detector 8 for detecting the open and closed positions of the lid member 22.

The output interface 40 is connected to a wiper motor driving circuit 50 for supplying electrical power to a wiper motor 52. The wiper motor 52 serves to cause the wiper 10 to move via a well known working-angle switching mechanism 54 and a well known link mechanism 56. The output interface 40 is also connected to a lid member actuator driving circuit 58 for supplying electrical power to a lid member actuator 60. The lid member actuator serves to cause the lid member 22 to be open and closed via a well known link mechanism 62. The output interface 40 is also connected to a working-angle switching actuator driving circuit 64 for supplying electrical power to a working angle switching actuator 66. The working-angle switching actuator 66 serves to switch the working-angle of the wiper 10 between preset angles $\theta_1$ and $\theta_2$ shown in FIG. 3, via the working-angle switching mechanism 54. In addition, the output interface 42 is connected to a lighting circuit 68 for supplying electrical power to light a warning lamp 68 to inform the user if the lid member 22 goes not open or close after the lid member switch 46 is so operated.

With the aforementioned construction, the operation of the wiper system, according to the present invention, is described below.

In the usual operation of the wiper system, when the user causes to the wiper switch 44 to be turned on, the lid member 22 is caused to move to an open position as shown by the broken line of FIG. 1 by means of the lid member actuator 60, so that the opening 14a of the wiper receiving cavity 14 is open. Thereafter, the wiper 10 oscillates within a predetermined sweeping angle $\theta_1$ shown in FIG. 3 so as to sweep raindrops or the like from the windshield 16.

Figure 4:
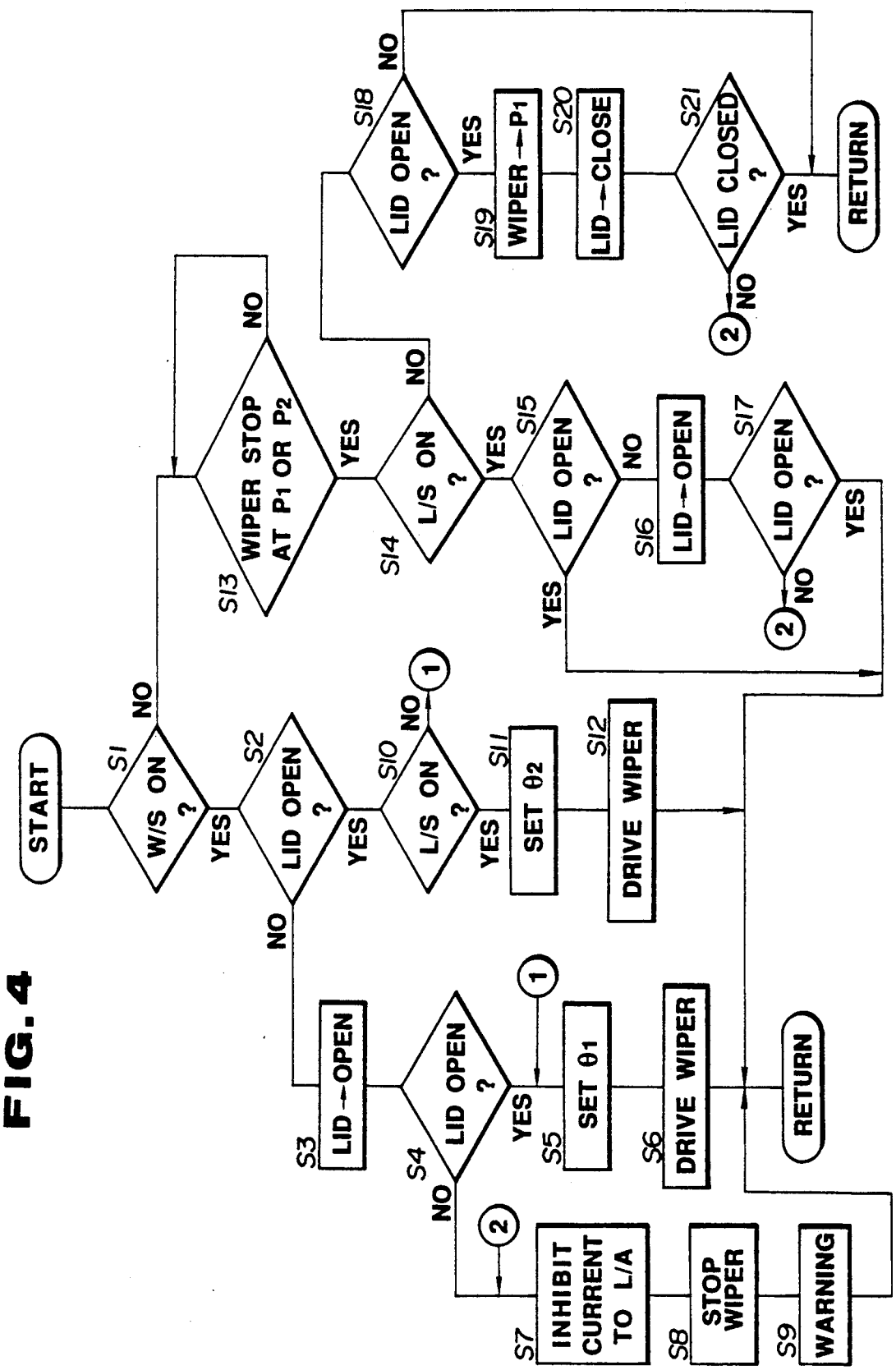
FIG. 4 is a flow chart showing a control process for the wiper system of FIG. 1.

FIG. 4 shows a control process of the control unit 30 of the wiper system, according to the present invention.

First, at step 1, it is determined whether or not the wiper switch 44 is ON. This may be determined by a signal input to the CPU 32 via the input interface 38. When it is determined that the wiper switch 44 is ON, the routine goes to step 2 in which it is determined whether or not the lid member 22 is open. This may be determined on the basis of a signal output from the position detector 48 to the CPU 32 via the input interface 38.

When it is determined that the lid member 22 is not open, the routine goes to step 3 in which an opening command for causing the lid member 22 to be open is output from the CPU 32 to the lid member actuator driving circuit 58 via the output interface 40. In response to the opening command, the lid member actuator driving circuit 58 supplies electrical power to the lid member actuator 60, so that the lid member 22 is caused to open. Then, the routine goes to step 4 in which it is determined whether or not the lid member 4 has actually opened, on the basis of a signal output from the position detector 48 to the CPU 32. When it is determined that the lid member 22 has opened, the routine goes to step 5 in which a switching command for setting the working-angle of the wiper 10 to be within a greater angle $\theta_1$ is output from the CPU 32 to the working-angle switching actuator driving circuit 64 via the output interface 40. In response to the switching command, the working-angle switching actuator driving circuit 64 supplies electrical power to the working-angle switching actuator 66, so that the working-angle of the wiper 10 is set to be within the angle $\theta_1$. Then, the routine goes to step 6 in which a driving command for causing the wiper 10 to move is output from the CPU 32 to the wiper motor driving circuit 50 via the output interface 42. In response to the driving command, the wiper motor driving circuit 50 supplies electrical power to the wiper motor 52, so that the wiper motor 52 causes the wiper 10 to oscillate on the windshield 16 within the set working-angle $\theta_1$ via the working-angle switching mechanism 54 and the link mechanism 56.

However, if at step 4, it is determined that the lid member 22 is not open, the routine goes from step 4 to step 7 in which voltage is prevented from being applied to the lid member actuator 60. Then, the routine goes to step 8 in which the wiper 10 is caused to stop. At step 9, a warning command is output from CPU 32 to the lighting circuit 68 to cause the warning lamp 70 to be turned on, which informs the user that the lid member 22 can not be open due to freezing thereof or the like, since the lid member 22 remains closed after the opening command is input to the lid member actuator driving circuit 60 at step 3.

At step 2, if it is determined that the lid member 22 is open, the routine goes from step 2 to step 10 in which it is determined whether or not the lid member switch 46 is ON. When it is not ON, the routine goes to step 5 for causing the wiper 10 to oscillate within the greater working-angle $\theta_1$, since the lid member 22 is open when the lid member switch 46 is turned off. On the other hand, when it is ON, indicating that the user has previously actuated the lid for reasons such as freezing or the like, the routine goes to step 11 in which a switching command for setting the working-angle of the wiper 10 to be within a smaller angle $\theta_2$ shown in FIG. 3 is output from the CPU 32 to the working-angle switching actuator driving circuit 64 via the output interface 40. In response to the switching command, the working-angle switching actuator driving circuit 64 supplies electrical power to the working-angle switching actuator 66, so that the working-angle of the wiper 10 is set to be within the smaller working-angle $\theta_2$. Then, the routine goes to step 12 in which the wiper motor 50 causes the wiper 10 to oscillate on the windshield 16 within the smaller working-angle $\theta_2$ so as to oscillate without danger of packing snow into the wiper recess, similar to the manner of step 6.

As shown in FIG. 3, the lower angular position $P_2$ of the wiper 10 when the wiper oscillates within the smaller working-angle $\theta_2$ is higher than the lower reversal position $P_1$ when it oscillates within the greater working-angle $\theta_1$. Therefore, it is possible to prevent the wiper 10 from sweeping snow from the windshield 16 into the wiper receiving cavity 14. Therefore, according to the construction of the present invention, a user may causes the lid member 22 to be open by means of the lid member switch 46 previous to actuation of the wipers, in a situation where the peripheral edge of the lid member 22 is frozen to the peripheral end of the opening 14a of the wiper receiving cavity 14, for example, in winter. In this case, the wiper 10 may smoothly move on the windshield 16 without packing snow into the cavity 14.

When the user causes the wiper switch 44 to be turned off, it is determined that the wiper switch 44 is OFF at step 1. Then, the routine goes to step 13 in which it is determined whether or not the wiper 10 is stopped at the lower angular position $P_1$ or $P_2$ (it stops at $P_1$ or $P_2$ respectively after oscillating within the working-angle $\theta_1$ or $\theta_2$. This may be determined on the basis of a signal output from a well known contact plate or the like which rotates synchronously with the wiper motor 52. When it is determined that the wiper 10 is positioned at the lower reversal position $P_1$ or $P_2$, the routine goes to step 14 in which it is determined that the lid member switch 46 is ON. When it is ON, the routine goes to step 15 in which it is determined whether or not the lid member 22 is open. When it is open, the routine returns the start. In this case, since the wiper switch 44 is turned off and the lid member switch 46 is turned on, the wiper 10 remains stopped at the lower angular position $P_1$ or $P_2$ while the lid member 22 is held to be open. On the other hand, when the lid member 22 is not open, the routine goes to step 16 in which the opening command for causing the lid member 22 to be open is output from the CPU 32 to the lid member actuator driving circuit 58 via the output interface 40 so that the lid member 22 is caused to be open. Then, the routine goes to step 17 in which it is determined whether or not the lid member 22 is actually open on the basis of the signal output from the position detector 48. When it is determined that the lid member 22 is open, the routine returns the start. In this case, since the lid member 22 may be open in response to the opening command, there is not a problem. On the other hand, when it is determined that the lid member 22 is not open, though the opening command was output to the lid member actuator driving circuit 58, the routine goes to step 7. This may be caused when, for example, the peripheral edge of the lid member 22 is frozen to the wiper receiving cavity 14. As mentioned above, at steps 7 to 9, voltage is prevented from being applied to the lid member actuator 58, and then the warning lamp 70 is turned on.

At step 14, when it is determined that the lid member switch 46 is OFF, the routine goes to step 18 in which it is determined whether or not the lid member 22 is open. When it is closed, the routine returns the start. This means that the wiper 10 is stopped at the lower reversal position $P_1$, since the lid member 22 closes after the wiper switch 44 is turned off while the lid member switch 46 is turned off. On the other hand, when it is determined that the lid member 22 is open at step 18, the routine goes to step 19. At step 19, if the wiper 10 is positioned at the lower angular position P₂ when it is stopped after it moves within the sweeping angle θ₂, the wiper 10 is caused to move further to the lower angular position P₁, in the wiper receiving cavity 14. In a case where the wiper is stopped after it was moving within the sweeping angle 01, such a process is not required since the wiper 10 will already be positioned at the lower reversal position P₁. Thereafter, the routine goes to step 20 in which a closing command for causing the lid member 22 to be closed is output from the CPU 32 to the lid member actuator driving circuit 58 so that the lid member 22 is closed by means of the lid member actuator 58. Then, at step 21, it is determined whether or not the lid member 22 is actually closed. When it is closed, the routine returns to start since there is no problem. On the other hand, when it is determined that the lid member 22 is not closed due to freezing thereof or the like, the routine goes to step 7. As mentioned above, at steps 7 to 9, voltage is prevented from being applied to the lid member actuator 58, and then the warning lamp 70 is turned on.

As mentioned above, when only the lid member switch 46 is turned on, the lid member 22 can remain open while the wiper 10 is stopped in accordance with the processes performed at steps 1, 13, 14, 15 and 16. Thereafter, when the lid member switch 46 is turned off, the lid member 22 can be closed in accordance with the processes performed at steps 1, 13, 14, 18, 19 and 20. In addition, when the lid member switch 46 is turned on while the wiper 10 is moving, the working-angle of the wiper 10 is switched from θ₁ to θ₂ in accordance with the processes performed at steps 1, 2, 10, 11 and 12. Thereafter, when the wiper switch 44 is turned off, the wiper 10 is stopped at the lower angular position P₂. When the lid member switch 46 is turned off after the wiper switch 44 is turned on again, the working-angle of the wiper 10 is switched from θ₂ to θ₁ in accordance with the processes performed at steps 1, 2, 10, 5 and 6.

As mentioned above, according to the present invention, the operation of the wiper 10 and the opening and closing of the lid member 22 can be automatically performed in response to turning ON or OFF of the wiper switch 44. In addition, if the lid member switch 46 is turned on or off when the wiper switch 44 is OFF, the lid member 22 can be open or closed. Therefore, if the lid member 22 is previously caused to be open when there is a problem, such as freezing, the wiper 10 can be moved independently of the lid in response to turning ON of the wiper switch 44.

In addition, it is possible to prevent the wiper 10 from thrusting snow into the wiper receiving cavity 14, since the wiper 10 may be stopped at the lower angular position P₂ thereof, which is higher than the lower reversal position P₁, when the lid member 22 is open in response to turning ON of the lid member switch 46.

What is claimed is:

1. A wiper system for an automotive vehicle comprising:
   a wiper pivotably supported on a vehicular body;
   receiving means for receiving said wiper therein, said receiving means having an opening through which the free end of said wiper goes in and out;
   lid member, associated with said opening of the receiving means, movable between a closed position in which said lid member closes said opening and an open position in which said lid member opens said opening;
   first actuator means for causing said wiper to pivotally move between a preset upper angular position and a first preset lower angular position arranged within said receiving means;
   second actuator means for causing said lid member to move between said open and closed positions;
   a first manual switch for allowing the pivotal movement of said wiper and the movement of said lid member;
   a second manual switch, operable independently of operation of said first manual switch, for allowing said lid member to move to said open position in response to turning ON thereof; and
   control means for outputting a first control signal to said first and second actuator means in response to turning ON of said first manual switch so that said first actuator means causes the pivotal movement of said wiper after said second actuator means causes the lid member to move to said open position, and for outputting a second control signal to said first and second actuator means in response to turning OFF of said first manual switch so that said second actuator means causes said lid member to move to said closed position after said first actuator means causes said wiper to be stopped, said control means further outputting a third control signal to said second actuator means in response to turning ON of said second manual switch so that said second actuator means causes said lid member to move to said open position;
   detecting means for monitoring at least one of said open and closed positions of the lid member to produce at least one open or closed position representative signal to be input to said control means;
   switching means, associated with said control means, for changing said first preset lower angular position into a second reset lower angular position arranged at a location higher than said first present lower angular position, after said open position is detected by said detecting means in response to turning ON of said second manual switch when said first manual switch is on; and
   wherein said control means outputs a fourth control signal to said second actuator remains when no open position is detected by said detecting means while at least one of said first and second manual switches is turned on, so that said second actuator means causes said lid member to open.

2. A wiper system as set forth in claim 1, wherein said control means outputs a fifth control signal to prevent said second actuator means from causing said lid member to move when no open position is detected by said detecting means after said control means outputs said fourth control signal to said second actuator means.

3. A wiper system as set forth in claim 2, which further comprises warning means for informing the user when said control means outputs said fifth control signal.

4. A wiper system as set forth in claim 1, wherein said control means outputs a sixth control signal to said first and second actuator means when said open position is detected by means of said detecting means while both of said first and second manual switches are turned off, so that said second actuator means causes said lid member to move to said closed position after said first actuator means causes said wiper to move from said first preset lower angular position to said second preset lower angular position.

5. A wiper system as set forth in claim 4, wherein said control means outputs a seventh control signal to prevent said second actuator means from causing to said lid member to move when said open position is detected by means of said detecting means after said control means outputs said sixth control signal to said second actuator means.

6. A wiper system as set forth in claim 5, which further comprises warning means for informing the user when said control means outputs said seventh control signal.